United States Patent
Szoucsek

(10) Patent No.: US 11,376,950 B2
(45) Date of Patent: Jul. 5, 2022

(54) METHOD FOR ENABLING REFUELING OF A MOTOR VEHICLE AND MOTOR VEHICLE

(71) Applicant: Bayerische Motoren Werke Aktiengesellschaft, Munich (DE)

(72) Inventor: Klaus Szoucsek, Haimhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 85 days.

(21) Appl. No.: 16/763,129

(22) PCT Filed: Dec. 3, 2018

(86) PCT No.: PCT/EP2018/083362
§ 371 (c)(1),
(2) Date: May 11, 2020

(87) PCT Pub. No.: WO2019/110515
PCT Pub. Date: Jun. 13, 2019

(65) Prior Publication Data
US 2020/0391587 A1    Dec. 17, 2020

(30) Foreign Application Priority Data

Dec. 6, 2017 (DE) ................. 10 2017 222 080.5

(51) Int. Cl.
*B60K 15/05* (2006.01)
*F17C 13/02* (2006.01)
(Continued)

(52) U.S. Cl.
CPC ............... *B60K 15/05* (2013.01); *F17C 5/06* (2013.01); *F17C 13/026* (2013.01);
(Continued)

(58) Field of Classification Search
CPC .......... B60K 15/04; B60K 2015/03013; B60K 2015/03019; B60K 2015/03421;
(Continued)

(56) References Cited

U.S. PATENT DOCUMENTS 7,637,389 B2 * 12/2009 Kanoya ................. F17C 13/026
220/581
8,156,970 B2 * 4/2012 Farese ........................ F17C 5/06
141/94

(Continued)

FOREIGN PATENT DOCUMENTS

DE        103 50 456 A1    6/2004
DE  10 2012 102 840 A1    6/2013
(Continued)

OTHER PUBLICATIONS

"Fueling Protocols for Light Duty Gaseous Hydrogen Surface Vehicles", SAE International, Jul. 2014, pp. 12-14 and 30-38 (13 pages).

(Continued)

*Primary Examiner* — Nicolas A Arnett
(74) *Attorney, Agent, or Firm* — Crowell & Moring LLP

(57) ABSTRACT

A method grants an enablement of refueling of a motor vehicle. The method includes the steps: i) detecting a tank temperature value which is indicative of the present temperature of at least one pressure vessel of the motor vehicle and/or of the fuel stored in the at least one pressure vessel; ii) determining a temperature difference value which is indicative of the present difference between the tank temperature value and an ambient temperature value which is indicative of the ambient temperature; and iii) releasing a tank flap, wherein the tank flap is released by the motor (Continued)

vehicle for the purposes of refueling only if the temperature difference value is lower than a temperature difference threshold value.

11 Claims, 2 Drawing Sheets

(51) Int. Cl.
    *F17C 5/06*     (2006.01)
    *B60K 15/03*     (2006.01)
    *B60K 15/04*     (2006.01)

(52) U.S. Cl.
    CPC ............... *B60K 2015/03013* (2013.01); *B60K 2015/03019* (2013.01); *B60K 2015/03421* (2013.01); *B60K 2015/0416* (2013.01); *B60K 2015/0561* (2013.01); *F17C 2250/0439* (2013.01)

(58) Field of Classification Search
    CPC .... B60K 2015/0416; B60K 2015/0561; F17C 5/06; F17C 13/026; F17C 2250/0439
    See application file for complete search history.

(56) References Cited

U.S. PATENT DOCUMENTS

| | | | |
|---|---|---|---|
| 10,465,849 B2 * | 11/2019 | Handa | F17C 5/007 |
| 10,920,933 B2 * | 2/2021 | Werlen | F25B 9/008 |
| 2004/0094230 A1 | 5/2004 | Ono et al. | |
| 2013/0014854 A1 | 1/2013 | Mori | |
| 2013/0146145 A1 | 6/2013 | Song et al. | |
| 2014/0026992 A1 | 1/2014 | Pearce et al. | |
| 2015/0306953 A1 | 10/2015 | Dudar et al. | |
| 2015/0362383 A1 | 12/2015 | Komiya et al. | |

FOREIGN PATENT DOCUMENTS

| | | | |
|---|---|---|---|
| DE | 11 2013 002 339 T5 | 3/2015 | |
| DE | 10 2015 206 782 A1 | 10/2016 | |

OTHER PUBLICATIONS

International Search Report (PCT/ISA/210) issued in PCT Application No. PCT/EP2018/083362 dated Apr. 24, 2019 with English translation (five (5) pages).

German-language Written Opinion (PCT/ISA/237) issued in PCT Application No. PCT/EP2018/083362 dated Apr. 24, 2019 (six (6) pages).

German-language Search Report issued in German Application No. 10 2017 222 080.5 dated Sep. 19, 2018 with partial English translation (11 pages).

* cited by examiner

METHOD FOR ENABLING REFUELING OF A MOTOR VEHICLE AND MOTOR VEHICLE

BACKGROUND AND SUMMARY OF THE INVENTION

The technology disclosed herein relates to a method for granting an enablement of refueling of a motor vehicle. The technology disclosed here furthermore relates to a motor vehicle having a pressure vessel system which uses the method disclosed here.

Pressure vessel systems are known per se. During the refueling of the pressure vessel, it must be ensured that the temperature in the pressure vessel does not, owing to the heat of compression, rise to a value above a threshold temperature. Such a threshold temperature may for example be predefined in a standard and/or by the component configuration. For example, it is known from the standard SAE J2601-2014 dated 15 Jul. 2017, and the preceding versions thereof, to perform the refueling taking into consideration the ambient temperature such that the temperature in the pressure vessel does not exceed the threshold temperature.

It is a preferred object of the technology disclosed herein to reduce or eliminate at least one disadvantage of a previously known solution, or to propose an alternative solution. In particular, it is a preferred object of the technology disclosed here to make the refueling of such pressure vessel systems even safer irrespective of the refueling site and/or of the state of the pressure vessel. Further preferred objects may arise from the advantageous effects of the technology disclosed here. The object(s) is/are achieved by means of the subject matter of the independent patent claims. The dependent claims constitute preferred refinements.

The object is achieved by means of the method disclosed here for granting an enablement of refueling, by means of the method disclosed here for refueling, and by means of the motor vehicle disclosed here.

The method disclosed here for granting an enablement of refueling comprises the steps:

detecting a tank temperature value which is indicative of the present temperature of at least one pressure vessel of the motor vehicle and/or of the fuel stored in the at least one pressure vessel;

determining a temperature difference value which is indicative of the present difference between the tank temperature value and an ambient temperature value which is indicative of the ambient temperature; and releasing a tank flap, wherein the tank flap is released by the motor vehicle for the purposes of refueling only if the temperature difference value is lower than a temperature difference threshold value.

The at least one tank temperature value may be indicative of the present temperature of the at least one pressure vessel. The temperature of the pressure vessel may be detected directly or indirectly by means of various methods. For example, for this purpose, temperature sensors may be provided on the pressure vessel wall. Alternatively or in addition, the tank temperature value may be indicative of the present temperature of the fuel that is stored in the pressure vessel. The prior art has disclosed methods for determining the temperature of the fuel in the pressure vessel. For example, at least one temperature sensor may be installed in the interior of the pressure vessel.

The tank temperature value may be indicative of a maximum temperature or an averaged mean temperature. The tank temperature value could, as it were, also be approximated from other physical variables.

The method disclosed here furthermore comprises the step whereby an ambient temperature value is directly or indirectly detected. The ambient temperature value is indicative of the ambient temperature in the vehicle surroundings. For example, the ambient temperature value may be detected by means of an ambient temperature sensor of the motor vehicle. Alternatively or in addition, the ambient temperature value may be provided to the vehicle by telemetric means.

The temperature difference value is indicative of the present difference between the tank temperature value and the ambient temperature value. In a preferred refinement, the motor vehicle detects both the temperature of the fuel and/or of the pressure vessel and the ambient temperature for the purposes of determining the temperature difference value. Preferably, in the method disclosed here, provision is made whereby the ambient temperature is subtracted from the detected temperature of the fuel and/or of the pressure vessel.

The temperature difference threshold value is expediently selected such that, during a refueling process, taking into consideration the ambient temperature value, the maximum admissible tank temperature value is not reached. The maximum admissible tank temperature value may for example be a value which is indicative of the maximum admissible temperature that the pressure vessel and/or the fuel may exhibit in particular during the refueling process. For example, the maximum admissible temperature may be a maximum admissible temperature of 85° C. The temperature difference threshold value may for example be indicative of a maximum temperature difference between the fuel and/or pressure vessel and surroundings of at most 20° C. or at most 10° C.

In one refinement, the temperature difference threshold value is constant. In another refinement, the temperature difference threshold value varies with the ambient temperature. In particular, a first temperature difference threshold value may be assigned to a first ambient temperature and a second temperature difference threshold value may be assigned to a second ambient temperature, wherein the first ambient temperature is lower than the second ambient temperature, and wherein the first temperature difference threshold value is greater than the second temperature difference threshold value. For example, in the case of an ambient temperature of −30° C. and a tank temperature of −5° C., the resulting temperature difference of 25° C. may still be acceptable in order for the pressure vessel not to be inadmissibly heated as a result of the refueling process, whereas the same temperature difference of 25° C. could be critical in the case of an ambient temperature of +30° C. and a tank temperature of 55° C.

The method disclosed here may comprise the step whereby a tank flap is released. Here, the tank flap is provided in the body outer skin such that it covers a filler neck of the pressure vessel system of the motor vehicle. In a non-released state of the tank flap, the tank flap closes the filler neck, such that the filler neck is not accessible for a refueling process. In the non-released state, the tank flap generally runs flush with the surrounding body outer skin. In the non-released state, the tank flap cannot be opened. This rather requires a tank flap release by the motor vehicle or by at least one control unit of the motor vehicle. In general, the tank flap is released only for the refueling of the pressure vessel system, and is not released in all other operating states of the motor vehicle (for example during driving operation of the motor vehicle or in the parked state).

Here, the tank flap is released by the motor vehicle for the purposes of refueling only if the temperature difference value is lower than a temperature difference threshold value. The temperature difference threshold value is in this case a value which is indicative of the maximum temperature elevation of the pressure vessel in relation to the ambient temperature. Such a temperature difference may arise for example in that the pressure vessel has previously been refueled with relatively warm fuel, and the time until the follow-up refueling process has not been sufficient to allow complete cooling.

The method disclosed here may furthermore comprise the step whereby, after a refueling process has taken place, readiness of the motor vehicle for driving is granted only if the tank flap has been closed again after the refueling process. In other words, the motor vehicle can be started again only after the tank flap has been closed again. In particular, provision may be made whereby the tank flap is transferred back into the non-released state as a result of the closure of the tank flap. This method step ensures that, in the event of a subsequent (follow-up) refueling process, the method disclosed herein for granting the enablement of refueling must be performed again. If a vehicle user, directly after performing a first refueling process at one fueling pump of a filling station, performs a second refueling process at another fueling pump of the filling station, then the tank flap must firstly be closed for the purposes of moving the motor vehicle. Prior to the commencement of the second refueling process at the other fueling pump, the motor vehicle re-performs the method disclosed herein for granting the enablement of refueling. If the pressure vessel has now warmed up to an inadmissibly great degree as a result of the first refueling process, then the temperature difference value rises to a value above the temperature difference threshold value. The tank flap is consequently not released, and the second refueling process at the other fueling pump is prevented.

The method disclosed herein may comprise the step whereby a notification is output if the temperature difference value is again lower than the temperature difference threshold value. Thus, if an enablement of refueling is not granted, that is to say if at a first point in time, the temperature difference value is not lower than a temperature difference threshold value, then the method disclosed here may furthermore detect the temperature difference value. This is expedient in particular if after the enablement of refueling not having been granted, further fuel is extracted from the pressure vessel and the pressure vessel therefore cools relatively quickly. If, at a second point in time which chronologically follows the first point in time, the temperature difference value then falls to a value which is lower than the temperature difference threshold value, then refueling of the motor vehicle can again be performed. In the method disclosed herein, provision may be made whereby a notification to the effect that a refueling process is again possible is output to the driver.

The technology disclosed herein relates, as it were, to a method for refueling a motor vehicle. The method comprises the steps:
releasing a tank flap by means of one of the methods disclosed here; and
refueling the motor vehicle taking into consideration the ambient temperature value.

The refueling of a motor vehicle taking into consideration the ambient temperature is familiar to a person skilled in the art and is disclosed for example in the standard SAE J2601-2014 dated 15 Jul. 2017. With the technology disclosed here, it can be ensured that a pressure vessel is not thermally loaded to an inadmissibly great extent as a result of two successive refueling processes.

The technology disclosed here furthermore relates to a motor vehicle (for example passenger motor vehicles, motorcycles, utility vehicles) which is configured to carry out at least one of the methods disclosed here.

The motor vehicle comprises a pressure vessel system. The pressure vessel system serves for storing fuel which is gaseous under ambient conditions. The pressure vessel system may for example be used in a motor vehicle which is operated with compressed ("Compressed Natural Gas"=CNG) or liquefied (LNG) natural gas or with hydrogen. Such a pressure vessel system comprises at least one pressure vessel, in particular a composite overwrapped pressure vessel. The pressure vessel may for example be a cryogenic pressure vessel or a high-pressure gas vessel. High-pressure gas vessels are designed to, at ambient temperatures, store fuel permanently at a nominal operating pressure (also referred to as nominal working pressure or NWP) of approximately 350 barg (=positive pressure in relation to atmospheric pressure), more preferably of approximately 700 barg or higher. A cryogenic pressure vessel is suitable for storing the fuel at the above-stated operating pressures even in the presence of temperatures which lie considerably below the operating temperature of the motor vehicle.

The motor vehicle disclosed here furthermore comprises at least one control unit. The control unit is inter alia configured to carry out the method steps disclosed here. For this purpose, the control unit may, on the basis of provided signals (for example measure temperature values), control the actuators of the system at least partially and preferably entirely by closed-loop control or open-loop control. The control unit may influence at least the tank flap. Alternatively or in addition, the control unit may also be jointly integrated into another control unit, for example into a superordinate control unit. The control unit may interact with further control units of the motor vehicle.

The control unit may be configured to detect the tank temperature value and the ambient temperature value and determine the temperature difference value. Furthermore, the control unit may be configured to release the at least one tank flap, wherein the control unit releases the tank flap from the motor vehicle for the purposes of refueling only if the temperature difference value is lower than the temperature difference threshold value.

In other words, the technology disclosed here relates to a method for refueling a pressure vessel system, and to a correspondingly configured pressure vessel system.

In the short time of the refueling process (duration: generally a few minutes), the temperature in the pressure vessel system rises in particular owing to the heat of compression. If the vehicle is subsequently parked, it takes a relatively long time (generally several hours) until the pressure vessel has cooled, because the pressure vessel is relatively well insulated by the fiber-reinforced layer. If the vehicle is instead driven, the pressure vessel cools again relatively quickly owing to the expansion-induced refrigeration effect. In order for overheating of the pressure vessel as a result of refueling of an excessively warm vessel to be prevented using simple means, a refueling process should be reliably prevented until such time as the temperature in the pressure vessel is higher by more than a threshold amount, for example 10° C., than the temperature of the ambient air.

The refueling process can otherwise be permitted. Thus, it is achieved using simple means that the refueling process does not, based on the ambient temperature, lead to overheating of the pressure vessel.

In modern filling stations, instances of termination of refueling during a refueling process are possible, such that a pressure vessel system is fully filled for example only after the third refueling attempt. Immediate follow-up refueling processes after instances of termination of refueling can advantageously remain possible. For this purpose, provision may advantageously be made whereby the prevention of the follow-up refueling process is activated only if the tank flap has been closed and the customer drives off again with the vehicle, that is to say the readiness of the vehicle for operation is again present. In one refinement, the control unit identifies this by the "extraction" operating mode, which must be present for this. In one refinement, it is also possible for at least one refueling termination valve to be provided in the vehicle, which valve prevents the commencement of a refueling process from the outset, or else terminates a refueling process at the vehicle side if the temperature of the fuel exceeds a fuel temperature threshold value. In this case, provision could be made not for the opening of the tank flap to be prevented but rather for the refueling termination valve to be activated and kept activated until the temperature difference criterion permits the follow-up refueling process. A refueling process that could generate excessively high temperatures in the pressure vessel system is advantageously prevented. If the pressure vessel system has cooled again, both pre-cooled refueling and refueling at ambient temperature are permitted again. Repeated refueling processes at one filling station owing to instances of refueling termination can advantageously be permitted without restrictions. The technology disclosed here can be realized without additional components or only with few additional components. This function can thus be realized in a relatively inexpensive, structural-space-neutral and/or weight-neutral manner. The solution disclosed here governs a situation which seldom arises in practice, without detriment to the normal refueling process.

The technology disclosed herein will now be discussed on the basis of the figures.

DETAILED DESCRIPTION OF THE DRAWINGS

Figure 1:
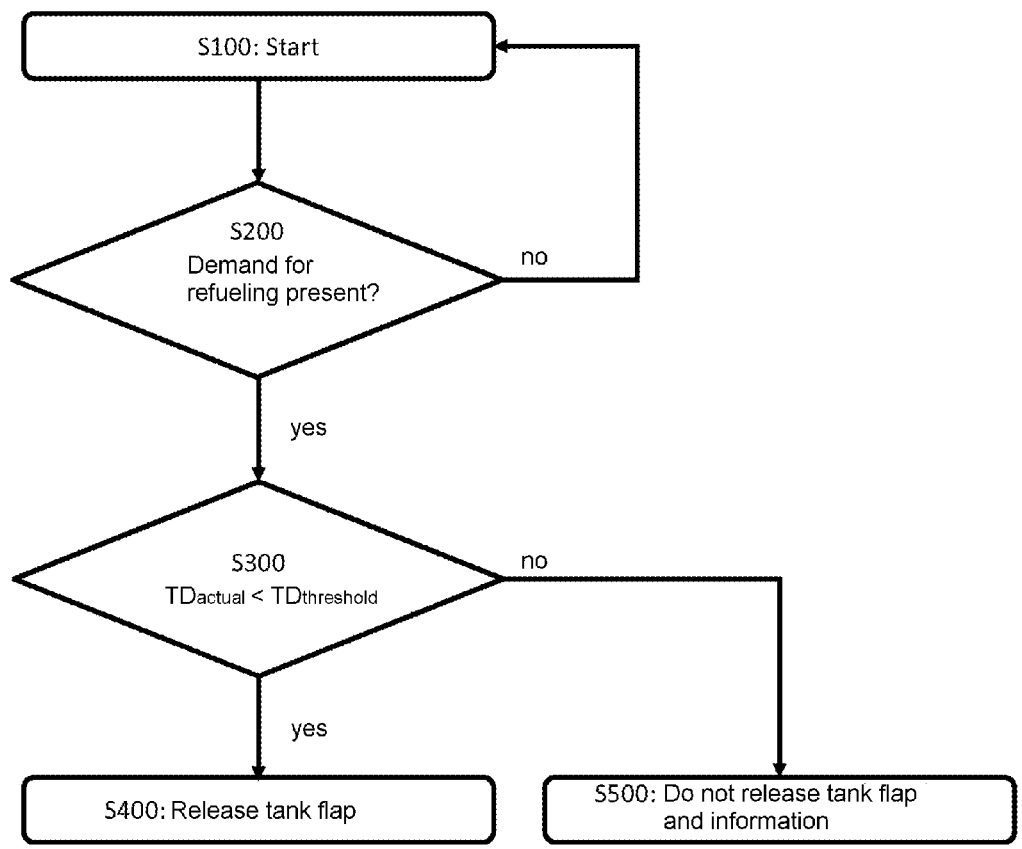
FIG. 1 shows a schematic flow diagram of the technology disclosed herein.

The method disclosed here begins with the step S100 in FIG. 1. In the step S200, it is checked whether a demand for refueling is present. A demand for refueling may be signaled by the driver of the motor vehicle for example by actuation of a refueling switch. Such a demand for refueling could however also be signaled in some other way. If the control unit detects no demand for refueling in the step S200, then the method is recommenced with step S100. However, if a demand for refueling is present, then it is determined in the step S300 whether the present temperature difference value $TD_{actual}$ is lower than the temperature difference threshold value $TD_{threshold}$. If this is the case, then the tank flap is released in the step S400. It is thus possible for the tank flap to be opened and for the refueling of the pressure vessel system to be performed. However, if the present temperature difference value $TD_{actual}$ is not lower than the temperature difference threshold value $TD_{threshold}$, then the tank flap is not released. It is preferably then possible for a corresponding notification to be output to the driver. The driver can then drive the at least partially refueled motor vehicle, whereby the temperature of the fuel and/or of the pressure vessel decreases.

Figure 2:
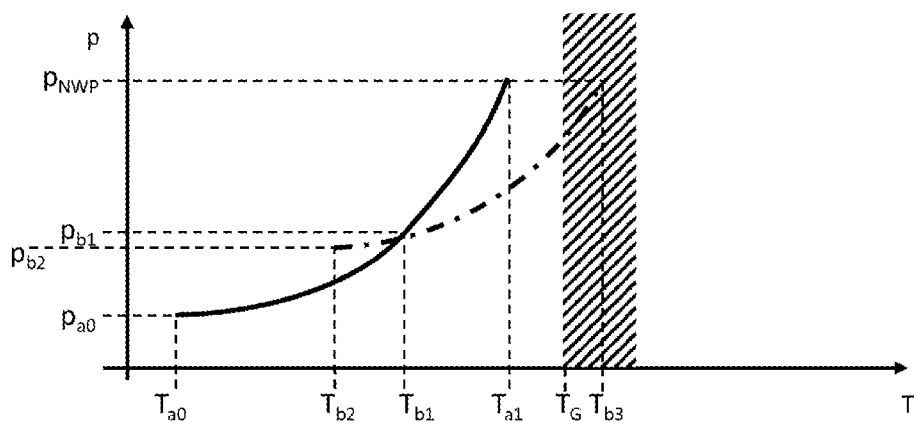
FIG. 2 schematically shows the warming of the pressure vessel in a manner dependent on the pressure vessel internal pressure.

In FIG. 2, the temperature in the pressure vessel is plotted versus the pressure vessel internal pressure. Here, a solid line is used to show a first refueling process which begins at a starting tank pressure $p_{a0}$ and a starting temperature $T_{a0}$ and, in this case, is ended when the refueling end pressure $p_e$ has been reached. As a result of this first complete refueling process without termination of refueling the fuel warms to the temperature $T_{a1}$.

If it is now assumed that said first refueling process is terminated in the presence of a refueling termination pressure $p_{b1}$, then the fuel in the pressure vessel has warmed to the temperature $T_{b1}$ as a result of this partial refueling process. If the refueling process is now continued, then the pressure vessel has generally not cooled completely. In the example shown here, the driver seeks to initiate a second refueling process at a point in time at which the pressure vessel exhibits a pressure vessel internal pressure $p_{b2}$ and the fuel exhibits a fuel temperature $T_{b2}$. If the pressure vessel were now refueled up to the refueling end pressure $p_e$, a temperature $T_{b3}$ considerably higher than the maximum admissible tank temperature $T_G$ would arise in the interior of the pressure vessel. Such a refueling process would lead to inadmissible overheating of the pressure vessel.

Figure 3:
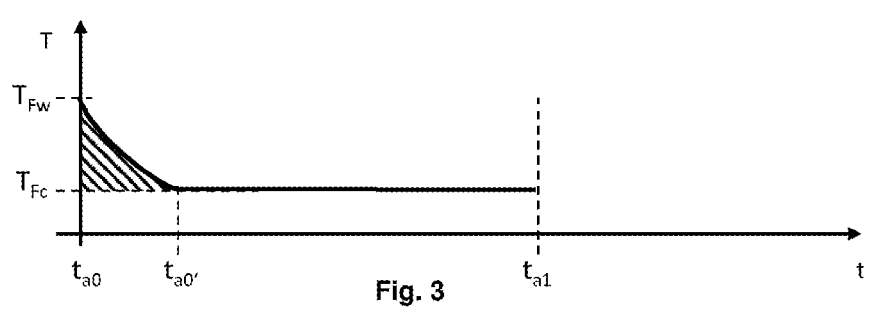
FIG. 3 schematically shows the profile with respect to time of the fuel temperature $T_F$ during the refueling process at one fueling pump.

FIG. 3 schematically shows the profile with respect to time of the fuel temperature during the first complete refueling process without refueling termination at one fueling pump (for example the solid line in FIG. 2). At the start of the refueling process, the fuel flows at a temperature $T_{Fw}$ into the pressure vessel, which temperature is considerably higher than the temperature $T_{Fc}$ of the fuel provided by the filling station. This is because the feed lines in the filling station and in the vehicle to the at least one pressure vessel are generally not cooled. Thus, the fuel which is controlled to a temperature $T_{Fc}$ in the filling station is at least partially warmed on the path to the pressure vessel. Said feed lines gradually cool during the refueling process. The temperature $T_F$ of the inflowing fuel thus gradually decreases until the temperature $T_F$ substantially corresponds to the temperature $T_{Fc}$ of the fuel of the filling station. Here, at the time $t_{a1}$, the first refueling process is completed as soon as the refueling end pressure $p_e$ has been reached. As a result of the warmed feed lines, an additional amount of heat is introduced into the pressure vessel, which is represented in FIG. 3 by the hatched area.

Figure 4:
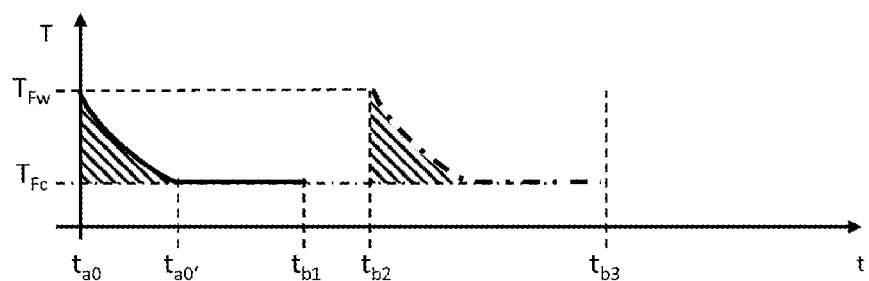
FIG. 4 schematically shows the profile with respect to time of the fuel temperature $T_F$ during the refueling process at two fueling pumps.

FIG. 4 schematically shows the profile with respect to time of the fuel temperature $T_F$ during two successive refueling processes which take place at two different fueling pumps. The first refueling process at the first fueling pump again begins at the time $t_{a0}$. Up until the time $t_{a0'}$, the fuel is introduced at a temperature $T_F$ which is higher than the temperature $T_{Fc}$ of the fuel controlled in terms of temperature in the filling station. An additional amount of heat is thus introduced in relation to the ideal cold refueling process, the additional amount of heat being illustrated here by the hatched area. At the time $t_{b1}$, the refueling process is interrupted. Here, the pressure $p_{b1}$ and the temperature $T_{b1}$ (see FIG. 2), for example, may take effect in the pressure vessel.

If the refueling process were now continued at another fueling pump, then it would in turn be necessary for said feed line of the other fueling pump, and at least partially the feed line of the pressure vessel, to be cooled. With the commencement of the second refueling process proceeding from the time $t_{b2}$, a further additional amount of heat would thus be introduced (second hatched area), which further additional amount of heat would not be introduced in the case of a single complete refueling process without interruption (cf. FIG. 3). If refueling were now in turn performed up to the refueling end pressure $p_e$, then the second additional amount of heat would result in an excessively high fuel temperature (for example $T_{b3}$ in FIG. 2) in the pressure vessel. In accordance with the technology disclosed here, at the time $t_{b2}$, the temperature difference value is determined, for example by ascertainment of the difference between the tank temperature $T_{b2}$ at the time $t_{b2}$ and the ambient temperature. In the present case, this temperature difference is greater than the temperature difference threshold value TD threshold, threshold, which in this case may for example amount to 10° C. Consequently, here, the second refueling process would be prevented, and a corresponding notification would be output to the driver. The driver can continue to utilize the motor vehicle with the fuel from the first refueling process, as a result of which the pressure tank cools. Here, the motor vehicle then continues to ascertain the temperature difference value $TD_{actual}$ TD during travel. As soon as the temperature difference value is lower than the temperature difference threshold value $TD_{threshold}$, a corresponding notification is output. This may be performed, as it were, predictively. For example, provision may be made whereby the motor vehicle or the controller determines whether the temperature difference value will be lower than the temperature difference threshold value $TD_{threshold}$ if a filling station in the surroundings of the vehicle is traveled to.

The above description of the present invention serves merely for illustrative purposes and not for the purposes of restricting the invention. Various changes and modifications are possible within the scope of the invention without departing from the scope of the invention and of its equivalents.

What is claimed is:

1. A method for granting an enablement of refueling of a motor vehicle, the method comprising:
   detecting a tank temperature value which is indicative of a present temperature of at least one pressure vessel of the motor vehicle and/or of fuel stored in the at least one pressure vessel;
   determining a temperature difference value which is indicative of a present difference between the tank temperature value and an ambient temperature value which is indicative of ambient temperature; and
   releasing a tank flap, wherein the tank flap is released by the motor vehicle for the purposes of refueling, only if the temperature difference value is lower than a temperature difference threshold value.

2. The method according to claim 1, wherein
   the temperature difference threshold value varies with the ambient temperature.

3. The method according to claim 1, wherein
   a prevention of a follow-up refueling process is activated only if the tank flap has been closed and the vehicle is driven.

4. The method according to claim 1, wherein
   the temperature difference threshold value is selected such that, during a refueling process, taking into consideration the ambient temperature value, a maximum admissible tank temperature value is not reached.

5. The method according to claim 1, wherein
   the temperature difference threshold value is indicative of a maximum temperature difference of at most 20° C.

6. The method according to claim 1, further comprising the step of:
   outputting a notification if the temperature difference value is not lower than the temperature difference threshold value.

7. The method according to claim 6, further comprising the step of:
   outputting a notification if the temperature difference value again becomes lower than the temperature difference threshold value.

8. The method according to claim 1, wherein
   after a refueling process has taken place, readiness of the motor vehicle for driving is granted only if the tank flap has been transferred back into a non-released state after the refueling process.

9. The method according to claim 1, further comprising the step of:
   determining whether a predicted temperature difference value will be lower than the temperature difference threshold value if a filling station in a surroundings of the vehicle is traveled to.

10. A method for refueling a motor vehicle, the method comprising:
    releasing a tank flap as a result of granting of an enablement of refueling by:
    detecting a tank temperature value which is indicative of a present temperature of at least one pressure vessel of the motor vehicle and/or of fuel stored in the at least one pressure vessel;
    determining a temperature difference value which is indicative of a present difference between the tank temperature value and an ambient temperature value which is indicative of ambient temperature, wherein the tank flap is released by the motor vehicle purposes of refueling, only if the temperature difference value is lower than a temperature difference threshold value; and
    refueling the motor vehicle taking into consideration the ambient temperature value.

11. A motor vehicle having a pressure vessel system, comprising:
    at least one pressure vessel;
    at least one tank flap; and
    at least one control unit, wherein the control unit is configured to:
    detect a tank temperature value which is indicative of a present temperature of the at least one pressure vessel and/or of fuel stored in the at least one pressure vessel,
    determine a temperature difference value which is indicative of a present difference between the temperature value and an ambient temperature value which is indicative of ambient temperature, and
    release the tank flap by the motor vehicle for purposes of refueling only if the temperature difference value is lower than a temperature difference threshold value.

* * * * *